United States Patent
Spitsberg et al.

(10) Patent No.: US 7,341,797 B2
(45) Date of Patent: Mar. 11, 2008

(54) ENVIRONMENTAL BARRIER COATING FOR SILICON-CONTAINING SUBSTRATES AND PROCESS THEREFOR

(75) Inventors: Irene Spitsberg, Loveland, OH (US); Brian Thomas Hazel, Cincinnati, OH (US); Christine Govern, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 207 days.

(21) Appl. No.: 10/709,288

(22) Filed: Apr. 27, 2004

(65) Prior Publication Data

US 2005/0238888 A1    Oct. 27, 2005

(51) Int. Cl.
B32B 18/00    (2006.01)

(52) U.S. Cl. .............. 428/701; 416/241 R; 416/241 B; 428/446

(58) Field of Classification Search ................ 428/446, 428/701; 416/241 R, 241 B
See application file for complete search history.

(56) References Cited

U.S. PATENT DOCUMENTS 6,254,935 B1    7/2001  Eaton et al. ............. 427/376.2
6,299,988 B1 *  10/2001 Wang et al. ................ 428/632
6,352,790 B1    3/2002  Eaton et al. ................ 427/689
6,365,288 B1    4/2002  Eaton et al. ................ 428/697
6,387,456 B1    5/2002  Eaton, Jr. et al. ........... 427/452
6,410,148 B1    6/2002  Eaton, Jr. et al. ........... 428/446

\* cited by examiner

*Primary Examiner*—John J. Zimmerman
*Assistant Examiner*—Aaron Austin
(74) *Attorney, Agent, or Firm*—William ScottAndes; Gary M. Hartman; Domenica N. S. Hartman

(57) ABSTRACT

A protective coating for use on a silicon-containing substrate, and deposition methods therefor. The coating has a barium-strontium-aluminosilicate (BSAS) composition that is less susceptible to degradation by volatilization and in corrosive environments as a result of having at least an outer surface region that consists essentially of one or more stoichiometric crystalline phases of BSAS and is substantially free of a nonstoichiometric second crystalline phase of BSAS that contains a substoichiometric amount of silica. The coating can be produced by carrying out deposition and heat treatment steps that result in the entire coating or just the outer surface region of the coating consisting essentially of the stoichiometric celsian phase.

20 Claims, 4 Drawing Sheets

ENVIRONMENTAL BARRIER COATING FOR SILICON-CONTAINING SUBSTRATES AND PROCESS THEREFOR

BACKGROUND OF INVENTION

1. Field of the Invention

This invention relates to coating systems suitable for protecting components exposed to high-temperature environments, such as the hot gas flow path through a gas turbine engine. More particularly, this invention is directed to a coating composition that exhibits improved high temperature stability when used to protect a silicon-containing substrate.

2. Description of the Related Art

Higher operating temperatures for gas turbine engines are continuously sought in order to increase their efficiency. While nickel, cobalt and iron-base superalloys have found wide use for components throughout gas turbine engines, alternative materials have been proposed. In particular, silicon-based non-oxide ceramics, most notably with silicon carbide (SiC) as a matrix and/or as a reinforcing material, are candidates for high temperature applications, such as combustor liners, vanes, shrouds, airfoils, and other hot section components of gas turbine engines. Components in many of these applications are in contact with highly corrosive and oxidative environments. It has been determined that Si-based ceramics lose mass and recede at high temperatures in water-containing environments because of the formation of volatile silicon hydroxide ($Si(OH)_4$). The recession rate due to volatilization or corrosion can be sufficiently high to require an external coating with high resistance to such environments.

Stability is a critical requirement of a coating system for a Si-based material in high temperature environments containing water vapors. Other important properties for the coating material include low thermal conductivity, a coefficient of thermal expansion (CTE) compatible with the Si-based ceramic material, low permeability to oxidants, and chemical compatibility with the Si-based material and a silica scale that forms from oxidation. As such, protective coatings for gas turbine engine components formed of Si-based materials have been termed environmental barrier coatings (EBC).

Barium-strontium-aluminosilicates (BSAS; $(Ba_{1-x}Sr_x)O$-$Al_xO_3$-$SiO_2$) and other alkaline earth aluminosilicates have been proposed as protective coatings for Si-based materials in view of their excellent environmental protection properties and low thermal conductivity. For example, U.S. Pat. Nos. 6,254,935, 6,352,790, 6,365,288, 6,387,456, and 6,410,148 to Eaton et al. disclose the use of BSAS and alkaline earth aluminosilicates as outer protective coatings for Si-based substrates. Of these, all but Pat. No. 6,352,790 disclose stoichiometric BSAS (molar ratio: $0.75BaO.0.25SrO.Al_2O_3.2SiO_2$; molar percent: $18.75BaO.6.25SrO.25Al_2O_3.50SiO_2$) as the preferred alkaline earth aluminosilicate composition, with layers of silicon and mullite ($3Al_2O_3.2SiO_2$) employed as bond coats. The BSAS coatings are typically produced by air plasma spraying (APS) followed by heat treatment to contain at least 50% of the crystalline celsian phase, which is stoichiometric BSAS. Pat. Nos. 6,254,935 and 6,365,288 further teach that the coating contains at least 80% of crystalline celsian and hexacelsian phases, which differ crystallographically but have the same stoichiometric BSAS chemistry.

Notwithstanding the above-noted advances, further improvements in coating life are required. In particular, longer exposures at temperatures sustained in the combustion environment of a gas turbine engine (e.g., above 2300° F. (about 1260° C.) combined with high pressure steam and high gas velocities) have resulted in the volatilization of existing BSAS materials, causing coating recession that ultimately leads to degradation of the environmental protective properties of the coating. In order for Si-based materials to be suitable for more demanding aircraft engine applications such as vanes, blades and combustors, coatings will be required that exhibit lower recession rates.

SUMMARY OF INVENTION

The present invention provides a protective coating and processes and compositions used to deposit such a coating, for example, on a silicon-containing article that will be exposed to high temperatures, such as the hostile thermal environment of a gas turbine engine. The protective coating has a BSAS composition that is less susceptible to degradation by volatilization as compared to prior art BSAS-based coating compositions.

The coating composition of this invention has at least an outer surface region that consists essentially of stoichiometric crystalline phases of BSAS and is substantially free of a nonstoichiometric second crystalline phase of BSAS. As used herein, "substantially free" means at most ten volume percent and preferably not more than five volume percent of the second phase. The second phase is a lamella phase that has been determined by this invention to contain roughly an equamolar ratio of BaO/ SrO, $Al_2O_3$, and $SiO_2$, and therefore differs from stoichiometric BSAS (molar ratio: $0.75BaO●0.25SrO●Al_2O_3●2SiO_2$; molar percent: $18.75BaO●6.25SrO●25Al_2O_3●50SiO_2$). As such, the second phase contains a substoichiometric amount of silica. Furthermore, the second phase tends to be strontium-rich, i.e., SrO constitutes greater than 25 molar percent of the combined BaO+SrO content in the second phase. According to one aspect of the invention, the second phase of BSAS has been determined to form when stoichiometric BSAS is deposited using previously known (e.g., Eaton et al.) techniques and powder compositions. While the second phase has been observed and ignored in the past, the present invention has identified the second phase as being unstable and volatilizing when subjected to high-temperature environments that contain water and/or corrosive agents such as sea salt. Accordingly, by eliminating the second phase from at least the outer surface region of the protective coating, degradation of the protective coating is inhibited.

A protective coating of this invention can be produced by carrying out deposition and heat treatment steps that result in at least the outer surface region of the protective coating consisting essentially of stoichiometric phases of BSAS and substantially free of the second phase. According to one embodiment of the invention, the protective coating is deposited so that substantially the entire protective coating consists essentially of BaO, SrO, $Al_2O_3$ and $SiO_2$ in approximately stoichiometric amounts for BSAS, and after heat treatment the protective coating consists essentially of one or more stoichiometric BSAS phases and is substantially free of the non-stoichiometric silica-lean second phase. Alternatively, the protective coating can be deposited to contain non-stoichiometric amounts of BaO, SrO, $Al_2O_3$ and $SiO_2$ for BSAS so as to contain the second phase following heat treatment, but then undergoes a second heat treatment step during which the second phase within at least the outer surface region of the coating is volatilized (and resultant porosity is sealed), such that essentially only one or more stoichiometric BSAS phases remain in the outer surface region. With this approach, a second region of the protective coating may remain beneath the outer surface region and contain non-stoichiometric BSAS and the second phase.

BSAS protective coatings of this invention are capable of withstanding higher temperatures and/or longer exposures to the combustion environment within a gas turbine engine as a result of the substantial absence of the second phase, whose susceptibility to volatilization leads to coating recession. The protective coatings of this invention are also believed to be more resistant to corrosive environments (e.g., sea salt) and CMAS-containing environments, which also lead to severe degradation and increased recession rates of BSAS coatings of the prior art. As such, the BSAS protective coatings of this invention are able to exhibit improved performance in corrosive environments and exhibit increased volatilization resistance at temperatures above 2300° F. (about 1260° C.) while subjected to high gas velocities, enabling the coatings to be used in more demanding aircraft engine applications such as vanes, blades and combustors.

Other objects and advantages of this invention will be better appreciated from the following detailed description.

DETAILED DESCRIPTION

The present invention is directed to a coating composition for an environmental barrier coating system suitable for protecting silicon-containing components subjected to high temperatures in the presence of water (water vapor) and corrosive agents, including the high and low pressure turbine vanes (nozzles) and blades (buckets), shrouds, combustor liners and augmentor hardware of gas turbine engines. Examples of silicon-containing materials for such applications include monolithic materials (e.g., silicon carbide, silicon nitride, etc.), composite materials containing a dispersion of silicon carbide, silicon nitride, and/or silicon reinforcement material in a metallic or nonmetallic matrix, composite materials having a silicon carbide, silicon nitride and/or silicon-containing matrix, and composite materials that employ silicon carbide, silicon nitride and/or silicon as both the reinforcement and matrix materials (e.g., SiC/SiC ceramic matrix composites (CMC)). While the advantages of this invention will be described with reference to gas turbine engine components, the teachings of the invention are generally applicable to any silicon-containing component whose silicon content is subject to volatilization.

Figure 1:
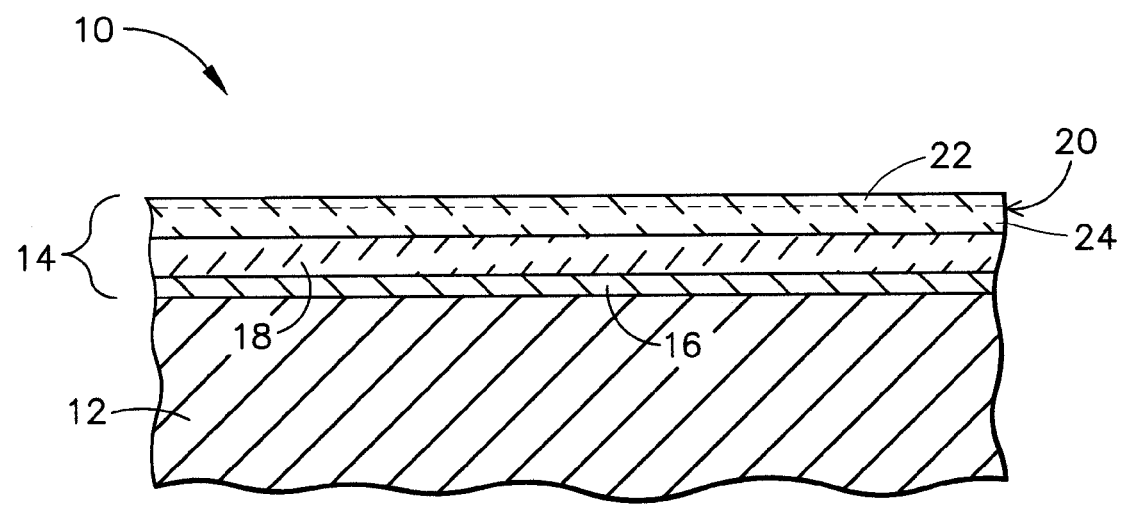
FIG. 1 schematically represents a barrier coating system in accordance with the present invention.

A multilayer coating system 14 in accordance with an embodiment of this invention is schematically represented in FIG. 1. The coating system 14 is shown as protecting a surface region 12 of a silicon-containing component 10. The coating system 14 is represented as including a protective coating 20 formed of BSAS and a multilayer bond coat comprising bond coat layers 16 and 18. The coating system 14 is intended to provide environmental protection to the underlying surface region 12 and reduce the operating temperature of the component 10, thereby enabling the component 10 to survive within higher temperature environments than otherwise possible. To promote the latter, a top coat (not shown) of a suitable insulating material such as stabilized zirconia, preferably yttria-stabilized zirconia (YSZ), may be deposited on the outer surface of the protective coating 20.

The major mechanism for degradation of silicon and silicon-based compounds (e.g., silicon carbide) in a water-containing environment is the formation of volatile silicon hydroxide ($Si(OH)_4$). As known, alkaline-earth metal ceramic compositions such as BSAS exhibit low diffusivity to oxidants, e.g., oxygen and water vapor, and therefore are able to inhibit oxidation of the silicon content within the surface region 12, while also being sufficiently chemically and physically compatible with the surface region 12 to remain adherent to the region 12 under severe thermal conditions. The bond coat layers 16 and 18 serve to promote the adhesion of the coating 20 to the surface region 12 of the component 10. Suitable materials for the bond coat layers 16 and 18 include silicon and mixtures of mullite and BSAS, respectively, in accordance with prior art practice. In addition to providing environmental and thermal protection to the underlying surface region 12, the BSAS protective coating 20 is also physically compliant with SiC-containing materials (such as the surface region 12) and is relatively compatible with mullite and the Si-based surface region 12 in terms of CTE. A suitable thickness range for the protective coating 20 is about 50 to about 1000 micrometers, depending on the particular application.

According to the invention, the BSAS composition of the protective coating 20 has a crystalline microstructure characterized by the presence of one or more stoichiometric phases (molar ratio: $0.75BaO.0.25SrO.Al_2O_3.2SiO_2$) of BSAS and, at least within an outer surface region 22 of the coating 20, by the substantial absence of a second crystalline phase of BSAS that contains approximately equal molar amounts of $BaO+SrO$, $Al_2O_3$, and $SiO_2$. More particularly, the second phase sought to be avoided by the present invention is a lamella phase that contains a sub-stoichiometric amount of silica, and furthermore tends to be strontium-rich, i.e., SrO constitutes greater than 25 molar percent of the combined BaO+SrO content in the second phase. The second phase is intentionally avoided (ideally zero volume percent, preferably not more than five volume percent, and at most ten volume percent) in at least the outer surface region 22 based on investigations discussed below, which showed that the second phase is prone to volatilization when exposed to water vapors at high temperatures and prone to forming volatile reaction products when exposed to corrosive agents at high temperatures.

The following discussion will use the term "stoichiometric phase" to refer to both the celsian and hexacelsian phases of BSAS, which have the same stoichiometric chemistry. The celsian phase is the preferred phase, though the hexacelsian phase may also be present in the coatings of this invention.

Figure 8:
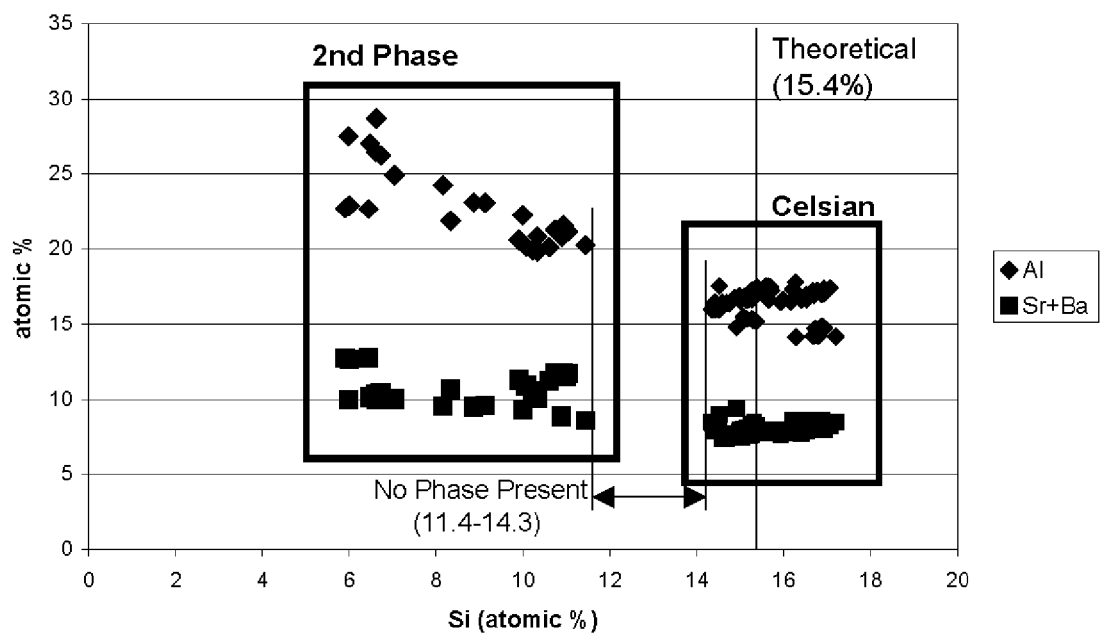
FIG. 8 is a graph comparing the atomic silicon contents of the stoichiometric celsian phase of BSAS and the nonstoichiometric second phase of BSAS.

To ensure a crystalline microstructure that consists essentially of the stoichiometric phase, the BSAS composition of the protective coating 20 of this invention preferably has a silica content of at least 47 molar percent, and preferably has a near-stoichiometric silica content, i.e., about 50 molar percent or more. For this purpose, the protective coating 20 may have the stoichiometric composition for BSAS (by molar percent, about 18.75% barium oxide, about 6.25% strontia, about 25% alumina, about 50% silica, and likely incidental impurities) throughout its thickness or at least in the outer surface region 22. With sufficient silica content, the protective coating 20 (or at least its outer surface region 22) can be processed in accordance with the invention to be substantially free of the second phase. This aspect of the invention is evident from FIG. 8, which summarizes data obtained during investigations that led to the invention. FIG. 8 evidences that the stoichiometric celsian phase of BSAS and the nonstoichiometric second phase of BSAS contain distinctly different amounts of silicon (and therefore, silica). Whereas the celsian phase has a nominal silicon atomic content of about 15.4%, generally encompassing a range of about 14.3 to 17.2 atomic percent based on investigations discussed below, the second phase appears to have a silicon atomic content of less than 11.4%. From XRF (X-ray fluorescence) bulk chemistry measurements made on coatings deposited by air plasma spraying (APS) and powders used to deposit the coatings, it was determined that a powder having a silicon content near the theoretical 15.4 atomic percent would produce a coating having a bulk average silicon content of about 14.4 atomic percent.

Figure 9:
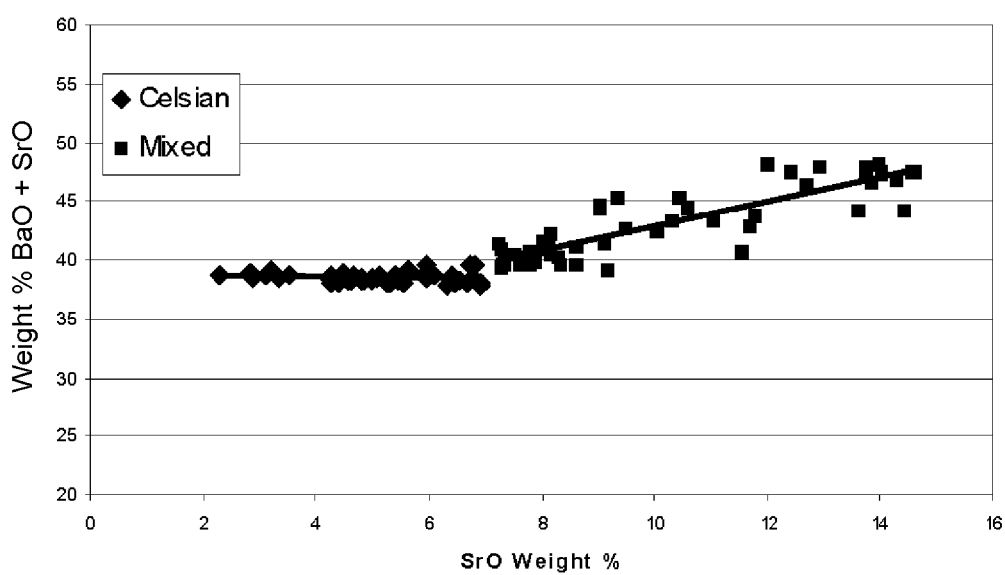
FIG. 9 is a graph showing the phase stability range for the stoichiometric celsian phase of BSAS as a function of SrO content.

In view of the above-noted tendency for strontia to constitute greater than 25 molar percent of the BaO+SrO content in the second phase, the protective coating 20 (or at least its outer surface region 22) preferably has a BaO+SrO content of about 25 molar percent in accordance with the stoichiometric composition of BSAS, but with strontia constituting less than 25 molar percent of the BaO+SrO content, i.e., the coating 20 has a strontia content of less than 6.25 molar percent. The chemistries of the stoichiometric celsian and nonstoichiometric second phases of BSAS can also be plotted as a function of strontia content. From FIG. 9, which again summarizes data obtained during investigations that led to the invention, it can be seen that for strontia contents of about 2.3 to about 6.9 weight percent, the BaO+SrO content remains approximately constant. Converting the BaO+SrO content to atomic percent of Ba+Sr shows the Ba+Sr level to be within the Ba+Sr range for the celsian phase (0.8 to 1.9 atomic percent strontium based on a constant total Ba+Sr atomic percent of 7.6 to 7.8%). As can be seen from comparing this strontium level to the reported average for stoichiometric BSAS, the coating compositions summarized in FIG. 9 can be seen to be a strontium-lean celsian phase (1.7 to 1.9 atomic percent strontium). Further comparison of these levels with those found by XRF of APS-deposited bulk BSAS coatings (average Ba+Sr of about 8.4 atomic percent) evidences that the coating materials had Ba+Sr levels greater than the maximum celsian strontium solubility seen in FIG. 9. It was theorized that due to the excess strontium (from microprobe results, an average of 2.2 atomic percent compared with 1.7 to 1.9 atomic percent), the BSAS coatings were forced to form the strontium-rich second phase. As suggested from FIG. 9, the amount of the second phase formed would be expected to depend on the amount of strontium in the bulk material.

Based on the above observations and analysis, it is believed that previous attempts to produce a stoichiometric BSAS coating from powders containing nearstoichiometric amounts of barium oxide, strontium, alumina and silica have resulted in the formation of the second phase described herein, in addition to the desired stoichiometric celsian phase of BSAS. In view of the above analysis and investigations discussed below, it was concluded that the second phase can be avoided or minimized by adjusting the silica content of the powder to compensate for silica losses during deposition. Alternatively or in addition, it is believed that the second phase can be avoided or minimized by reducing the strontia content in the powder to suppress the formation of the second phase on the basis of strontium solubility in the celsian phase. The latter approach would require the powder to have a silica content at or above the stoichiometric amount (50 molar percent) for BSAS, and slight compensation with the alumina content in the powder. On this basis, suitable approximate compositions (molar percent) for powders that can be used to deposit by APS a BSAS coating that is substantially free of the second phase are summarized below.

|  | Powder A | Powder B |
|---|---|---|
| BaO | 18.7-19.1% | 18.4-18.8% |
| SrO | 4.5-4.9% | 4.5-4.9% |
| $Al_2O_3$ | 25.1-26.1% | 23.4-24.4% |
| $SiO_2$ | 50.4-51.4% | 52.3-53.3% |

The composition of Powder A is based on reducing the strontia content of the powder per the strontium solubility model while providing a silica content of at least 50 molar percent. The composition of Powder B is also based on lowering the strontia content, but with a further increase in the silica content of the powder. In each case, the silica content has been increased above that used in the past, and compensates for silica volatilization that occurs during deposition by APS. Furthermore, strontia constitutes less than 25 molar percent of the BaO+SrO content of each powder, and therefore BSAS coatings deposited from the powders. Comparing Powders A and B, it can be seen that their BaO+SrO contents are substantially the same and below the 25 molar percent level of stoichiometric BSAS, yielding a silica to BaO+SrO molar ratio of greater than 2:1. A notable difference is that the alumina content of Powder B is lower than in Powder A to accommodate the higher silica content in Powder B. Powder B would be predicted to produce an as-deposited coating whose bulk chemistry is substantially stoichiometric. In contrast, the higher alumina content of Powder A (greater than 25 molar percent) pushes the composition of the resulting BSAS coating toward a more alumina-rich composition. As a result of silica loss during deposition, BSAS coatings deposited from Powder A should fall near the celsian-alumina two-phase region, resulting in an alumina phase content of about 2 atomic percent. This additional phase is believed to provide an added margin for avoiding the strontia-rich second phase. Because an alumina phase content in excess of 20 atomic percent may affect thermal expansion to a significant degree, a suitable upper limit for the alumina phase content in BSAS coatings deposited from Powder A is believed to be about 20 atomic percent.

The above observations and analysis were based on a series of investigations that led to this invention. In a first investigation, BSAS coatings intended to have the stoichiometric composition were deposited on Si-containing substrates by APS followed by heat treatment in accordance with U.S. Pat. No. 6,410,148. The powder used in the deposition process had a near-stoichiometric composition of, by molar percent, about 19.0% barium oxide, about 6.8% strontia, about 24.8% alumina, and about 49.4% silica, and therefore had a silica content only slightly below the stoichiometric amount of 50 molar percent. During deposition, the substrates were held at about 250° C. to about 350° C. Following deposition, the coatings were heat treated at about 1250° C. for about twenty-four hours to provide stress relief and promote bonding of the sprayed particles.

Figure 2:
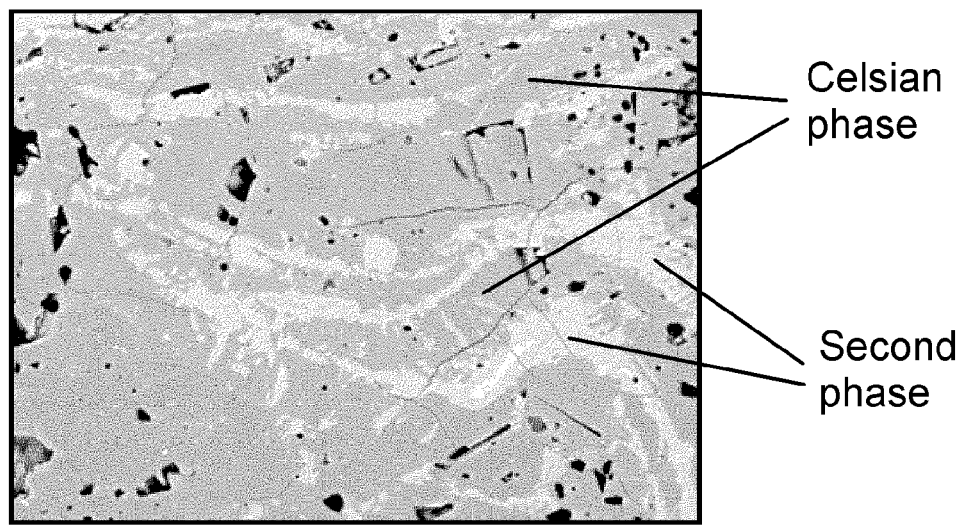
FIG. 2 is a scanned image of a BSAS coating having a crystalline microstructure containing the stoichiometric celsian phase of BSAS and a nonstoichiometric second phase of BSAS as a result of being deposited in accordance with prior art practices.

An SEM image of one of the coatings is shown in FIG. 2, and evidences that the coating contained two crystalline phases: the celsian phase corresponding to stoichiometric BSAS, and the nonstoichiometric second phase discussed above, which is iso-structural to the celsian phase (e.g., exhibits the same X-ray pattern). In FIG. 2, the celsian phase appears as the darker regions while the lighter regions are the second phase. The second phase was determined to be nonstoichiometric, having higher $SrO_2$ and $Al_2O_3$ contents and a lower $SiO_2$ content than the stoichiometric celsian phase.

Figure 3:
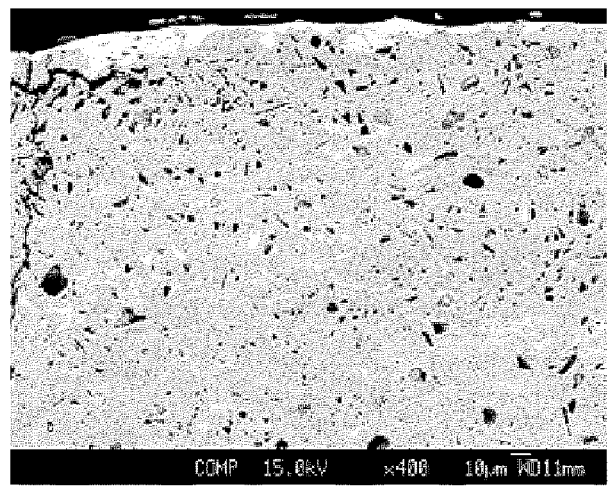
FIGS. 3 and 4 are scanned images of a BSAS coating of the type shown in FIG. 2 following exposure to high temperatures and high gas velocities, resulting in volatilization of the second phase within the coating.
Figure 4:
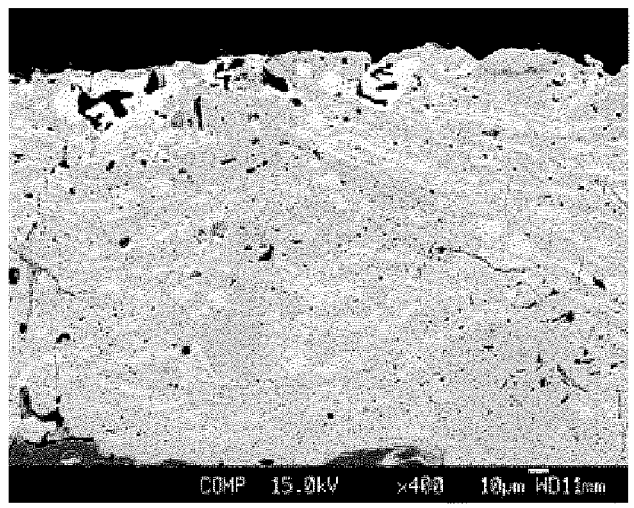

The coatings were exposed for about fifty hours to temperatures of between about 2500 and 2900° F. (about 1370 and 1600° C.) and water-containing air at high velocities of about Mach 0.3 to 0.5. SEM images of two of the coatings are shown in FIGS. 3 and 4. On careful examination of the coatings, it was determined that portions of the strontia-rich second phase had volatized, whereas the stoichiometric celsian phase had remained very stable. It was concluded that when exposed to water at high gas velocities, the second phase became unstable and began to volatilize through the loss of silica, resulting in pore formation throughout the coating thickness. In the asdeposited condition (e.g., deposition by APS and then heat treatment), the celsian and second phases of BSAS coatings appeared to be in equilibrium with each other. However, it was concluded that as the strontia-rich second phase degraded during the high-temperature exposure to water vapor, the chemical composition of the second phase changed, resulting in the second phase reacting with the celsian (stoichiometric) BSAS to form intermediate reaction products that are also volatile. The end result was the formation of through-thickness porosity at the original locations of the second phase and the subsequent formation of intermediate volatile phases, all of which led to the degradation of the coatings as seen in FIGS. 3 and 4.

Figure 5:
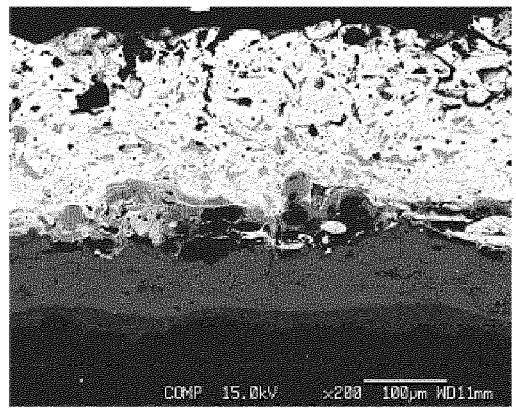
FIGS. 5, 6 and 7 are scanned images of a BSAS coating of the type shown in FIG. 2 following exposure to water vapor and sea salt at high temperatures, during which the second phase within the coating was reacted to form volatile species.
Figure 6:
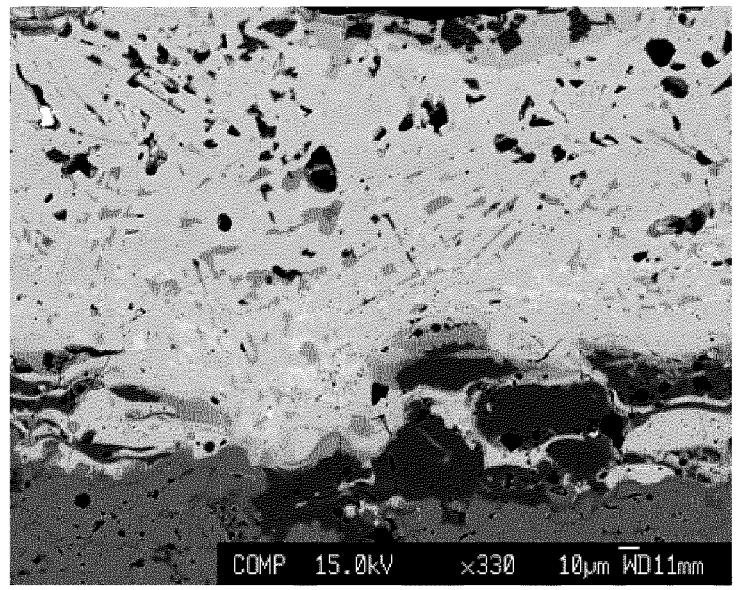
Figure 7:
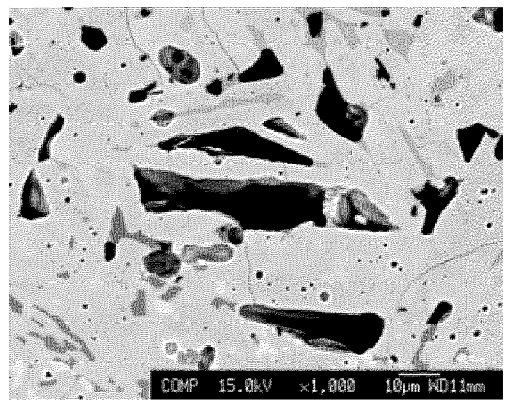

In another investigation, essentially identical BSAS coatings were exposed for about fifty hours to a combination of water vapor and sea salt (0.5-1 ppm) at temperatures between about 2200 and 2500° F. (about 1200 and 1370° C.). In FIGS. 5, 6 and 7, which are SEM images of one of the coatings, pores can be seen within the coating. Analysis of the coating indicated that CaO and MgO components of the sea salt had interdiffused into the strontia-rich second phase of the coating, forming MgO and CaO-silicate type amorphous components that were highly volatile. While there was no evidence that the sea salt species had diffused into the celsian phase, the MgO and CaO-silicate type amorphous components appeared to have quickly reacted with the celsian phase of the coating, forming additional amorphous volatile components and additional porosity.

From these investigations, it was concluded that a BSAS coating consisting of closer to 100% of the stoichiometric celsian phase of BSAS would be much less volatile and more corrosion resistant under conditions within a gas turbine engine. However, it was further concluded that additional steps were necessary to avoid formation of the second phase and thereby produce an as-deposited coating structure that is substantially free of the second phase, or to eliminate the second phase following coating deposition. In addition to tailoring the composition of the sprayed powder as discussed above, such steps might include process modifications and/or pre-processing of the powder (e.g., heat treating) before the spraying operation. Notably, it is theorized that the entire BSAS coating need not be substantially free of the second phase, in that sufficient improvement in coating performance should be achieved if just the outer surface region were processed to be substantially free of the second phase.

In a third investigation, additional BSAS coatings were deposited by APS on CFCC (continuous fiber ceramic composite) combustor liners for an extended engine test. As with the first and second investigations, the powder material used to deposit the coatings had a composition of, in molar percent, about 19.0% BaO, about 6.8% SrO, about 24.8% A1203, and about 49.4% SiO2, and therefore had a silica content only slightly below the stoichiometric amount. Also consistent with the two previous investigations, the coatings were targeted to have stoichiometric compositions (in molar percent, 18.75% BaO, 6.25% SrO, 25% $Al^2O^3$, and 50% $SiO^2$). However, XRF showed the coatings to have as-deposited compositions of, in molar percent, about 20.1% BaO, about 7.2%SrO, about 26.0% $Al^2O^3$, and about 46.8% $SiO^2$. Therefore, the coatings had a sub-stoichiometric silica content (i.e., below 50 molar percent), and strontia constituted more than 26 molar percent of the BaO+SrO content. A comparison of the powder and as-deposited coating chemistries indicated that the APS process caused a nominal 7.4 weight percent loss of $SiO_2$ by volatilization. SEM imaging of the coatings showed a two-phase crystalline structure similar to that seen in FIG. 2, namely, the stoichiometric celsian phase and the non-stoichiometric second phase. Image analysis approximated the second phase as present in an amount of about 15 volume percent.

It is worth noting that, because essentially the same powder compositions and spray processes were used in all three investigations, the BSAS coatings produced in the first and second investigations presumably had essentially the same chemistries as that found for the coatings produced in the third investigation, including a substoichiometric silica content of less than 47 molar percent and a BaO+SrO content of which SrO constitutes more than 25 molar percent.

From the above, it was concluded that the combination of near-stoichiometric BSAS powders and deposition processes used to deposit BSAS coatings in the past (e.g., Eaton et al.) were the cause of the presence of the second phase. In contrast to conventional wisdom, the conclusion drawn by this invention is that the second phase is undesirable as a result of being prone to volatilizing in water and gas velocity environments and causing coating degradation in sea-salt containing environments, both of which result in the formation of pores in BSAS coatings. Accordingly, the BSAS protective coatings of the present invention are deposited to have chemistries that inhibit the formation of the second phase, namely, through having a silica content of at least 47 molar percent and preferably about 50 molar percent, and preferably through having a BaO+SrO content of about 25 molar percent but with strontia constituting less than 25 molar percent of the BaO+SrO content, i.e., a strontia content of less than 6.25 molar percent. Such coatings are capable of being substantially free of pores formed by volatilization after extended periods at elevated temperatures, such as during operation of a gas turbine engine in which a CMC component protected by the coating is installed.

As was discussed above, the more optimal BSAS chemistry proposed by this invention can be obtained by employing a powder whose chemistry is sufficiently rich in silica so that silica losses due to volatilization during deposition result in the as-deposited coating have a silica content of at least 47 molar percent and preferably at or near 50 molar percent. As an alternative or in addition to an increased silica content, a powder can be used whose chemistry is sufficiently lean in strontia to inhibit the formation of the second phase as a result of the strontium solubility in the celsian phase. Immediately following deposition by APS, such compositions should produce a coating having a composition that would ensure a celsian phase content of very near 100%.

On the basis of the investigations described above, an alternative method to developing a near 100% celsian phase in a BSAS coating is to use a stoichiometric or nearstoichiometric BSAS powder in accordance with prior practices, with the result that the coating would contain a sub-stoichiometric amount of silica as a result of volatilization. Following heat treatment, after which both the celsian and second phases would be present, the coating is subjected to a temperature sufficient to eliminate the second phase by intentional volatilization. A suitable heat treatment for this purpose is believed to be near but below the melting temperature (1414° C.) of free silicon within the substrate or coating system. If a furnace is used, the duration of the heat treatment can be adjusted to control the amount of second phase volatized and to seal the resultant porosity. For example, a duration of about two to about ten hours is believed to be sufficient to eliminate the second phase from about 0.5 to 1.0 mil (about 10 to about 25 micrometers) of the outermost surface region of the coating, with longer durations increasing the depth to which the second phase is eliminated from the coating. With reference to FIG. 1, in such an approach the region 24 of the coating 20 beneath the outer surface region 22 would still contain non-stoichiometric barium-strontium-aluminosilicate (e.g., less than 47 molar percent silica), and therefore contain the second phase in addition to stoichiometric phases. In addition to heat treatments performed within a furnace, surface heat treatments can be performed by such methods as laser glazing or in-situ surface treatments performed with the plasma spray gun after coating deposition and with the powder feed turned off. An advantage of performing a surface treatment is the ability to locally heat the coating above the melting temperature of free silicon in the substrate beneath the coating.

While the invention has been described in terms of a preferred embodiment, it is apparent that other forms could be adopted by one skilled in the art. For example, suitable powder compositions will depend on the deposition process, which include thermal spray processes in addition to APS. Therefore, the scope of the invention is to be limited only by the following claims.

The invention claimed is:

1. A protective coating on a silicon-containing surface, the protective coating consisting essentially of barium oxide, strontia, alumina, and silica, and incidental impurities so as to have a barium-strontium aluminosilicate composition, the protective coating having an outer surface region consisting essentially of one or more stoichiometric crystalline phases of barium-strontium aluminosilicate and being substantially free of a nonstoichiometric second crystalline phase of barium-strontium aluminosilicate that contains an approximately equimolar ratio of BaO/SrO, $Al_2O_3$, and $SiO_2$, the protective coating having a second region beneath the outer surface region that consists essentially of the one or more stoichiometric crystalline phases of barium-strontium aluminosilicate and the nonstoichiometric second crystalline phase of barium-strontium aluminosilicate.

2. A protective coating according to claim 1, wherein the outer surface region of the protective coating contains sealed porosity.

3. A protective coating according to claim 1, wherein the outer surface region of the protective coating is in a thermal treated state.

4. A protective coating according to claim 1, wherein the outer surface region of the protective coating has a silica to BaO+SrO molar ratio at or above 2:1, has an alumina content of greater than 25 molar percent, and contains up to about 2 atomic percent of an alumina phase.

5. A protective coating according to claim 1, wherein the outer surface region of the protective coating contains at least 47 molar percent silica and the second region of the protective coating contains less than 47 molar percent silica.

6. A protective coating according to claim 1, wherein the outer surface region of the protective coating consists of, by molar percent, about 25% barium oxide+strontia, about 25% alumina, about 50% silica, and incidental impurities, and strontia constitutes less than 25 molar percent of the barium oxide+strontia content of the protective coating.

7. A protective coating according to claim 1, wherein the outer surface region of the protective coating has a thickness of about 10 to about 25 micrometers.

8. A protective coating according to claim 1, wherein the protective coating is part of a barrier coating system on the silicon-containing surface, the barrier coating system further comprising at least one intermediate layer between the protective coating and the silicon-containing surface, the at least one intermediate layer containing a material chosen from the group consisting of silicon and mullite.

9. A protective coating according to claim 1, wherein the protective coating consists of barium oxide, strontia, alumina, silica, and incidental impurities.

10. A protective coating according to claim 1, wherein the outer surface region of the protective coating contains not more than ten volume percent of the nonstoichiometric second crystalline phase.

11. A protective coating according to claim 1, wherein the outer surface region of the protective coating contains not more than five volume percent of the nonstoichiometric second crystalline phase.

12. A protective coating according to claim 1, further comprising a top coat of insulating material on the protective coating.

13. A protective coating according to claim 12, wherein the insulating material is stabilized zirconia.

14. A protective coating for a silicon-containg surface of a gas turbine engine component, the protective coating being a part of a barrier coating system comprising at least one intermediate layer on which the protective coating is deposited, the at least one intermediate layer containing a material chosen from the group consisting of silicon and mullite, the protective coating consisting of barium oxide, strontia, alumina, and silica, and incidental impurities so as to have a barium-strontium aluminosilicate composition, the protective coating having an outer surface region consisting essentially of the stoichiometric crystalline celsian phase of barium-strontium aluminosilicate and a second region beneath the outer surface region consisting essentially of the stoichiometric crystalline celsian phase of barium-strontium aluminosilicate and a nonstoichiometric crystalline lamella phase of barium-strontium aluminosilicate that contains an approximately equimolar ratio of BaO/SrO, $Al_2O_3$, and $SiO_2$;

wherein the outer surface region of the protective coating is in a thermal treated state and contains sealed porosity formed by volatilization of the nonstoichiometric crystalline lamella phase in the outer surface region.

15. A protective coating according to claim 14, wherein the outer surface region of the protective coating contains at least 50 molar percent silica.

16. A protective coating according to claim 14, wherein the outer surface region of the protective coating has a silica to BaO+SrO molar ratio at or above 2:1, has an alumina content of greater than 25 molar percent, and contains up to about 2 atomic percent of an alumina phase.

17. A protective coating according to claim 14, wherein the outer surface region of the protective coating consists of, by molar percent, about 25% barium oxide+strontia, about 25% alumina, about 50% silica, and incidental impurities.

18. A protective coating according to claim 17, wherein strontia constitutes less than 25 molar percent of the barium oxide+strontia content of the outer surface region of the protective coating.

19. A protective coating according to claim 14, further comprising a top coat of insulating material on the protective coating.

20. A protective coating according to claim 19, wherein the insulating material is stabilized zirconia.

* * * * *